Sept. 1, 1970          J. K. LOVITT          3,526,018
EVISCERATORS
Filed Dec. 5, 1967
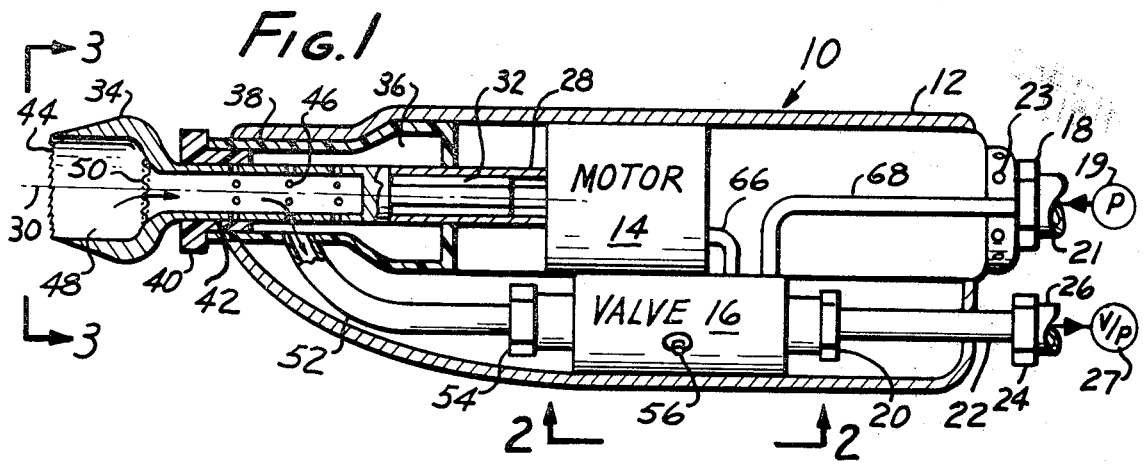
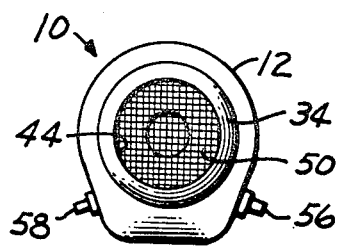
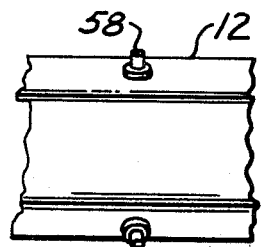
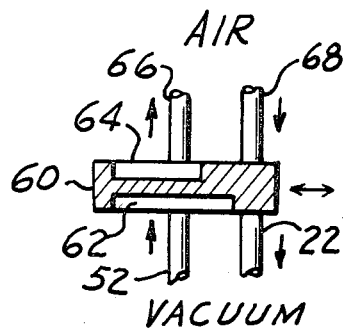
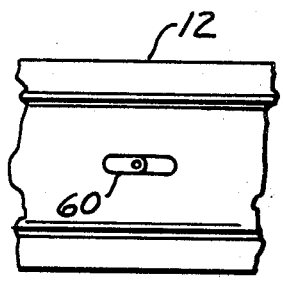
INVENTOR.
JOHN K. LOVITT
BY
ATTORNEYS.

United States Patent Office 3,526,018
Patented Sept. 1, 1970

3,526,018
EVISCERATORS
John Kenneth Lovitt, Bakersfield, Calif., assignor of twenty-four percent each to Emil C. Reed, Fadel N. Fadel, and James Bays, all of Bakersfield, Calif.
Filed Dec. 5, 1967, Ser. No. 688,235
Int. Cl. A22c 21/06
U.S. Cl. 17—1                                                    1 Claim

ABSTRACT OF THE DISCLOSURE

This disclosure relates to eviscerators for removing the entrails from animals.

An eviscerator according to the present disclosure comprises a cutter means having a cutter edge and adapted to be rotated about an axis. A cavity is formed in said cutter means and an opening is formed to said cavity adjacent the cutting edge of the cutter means. Motor means is adapted to rotate the cutter means about its axis, and vacuum means is adaped to exert a vacuum in said cavity in one condition.

The method of removing entrails from an animal according to the present disclosure comprises cutting an artificial opening in the animal from which the entrails are to be removed. Suction is then applied to the material within the artificial opening to hold the same, enabling the entrails to be withdrawn from the animal. Preferably, the artificial opening is cut through or around the anus of the animal.

---

This invention relates to eviscerators for removing the entrails and other matter from within carcasses of animals when preparing such carcasses for consumption.

Heretofore, the entrails of animals, particularly the entrails of poultry such as chicken and turkey, have been removed by manually cutting around the anus to free it, and thereafter pulling the entrails from the animal through the opening formed and cutting them free after they are removed. Considerable waste has occurred because of the difficulty of making a minimum-sized incision. Often a substantial amount of edible material was lost as the result of irregular or careless cutting.

An object of the present invention is to provide an eviscerator for removing the entrails of an animal.

Another object of the present invention is to provide an eviscerator which is portable, lightweight, easy to use, and which removes a minimum of edible material while permitting removal of all entrails.

Another object of the present invention is to provide a novel method for removing the entrails of an animal.

An eviscerator according to the present invention comprises cutter means having a cutter edge and an axis about which the cutter means may be rotated. A cavity is disposed within the cutter means and has an opening adjacent the cutting edge. Motive means is provided for rotating the cutter means about its axis and vacuum means is provided for drawing material into the cavity.

In the use of the eviscerator according to the present invention, the cutting edge of the eviscerator is applied to the anus of the animal and an opening is cut around the anus to cut the anus free. The entrails are, of course, attached to the anus, and a pull on the anus will remove them through the opening formed by removal of the anus. Suction is applied on the anus so that the anus is brought to the cavity and held by the tool while the pull is exerted.

According to an optical and desirable feature of the present invnetion, a novel method is provided which comprises cutting an artificial opening around the anus of the animal and withdrawing the entrails from an animal by applying suction to the anus such that the anus is withdrawn under vacuum from the artificial opening and the entrails are withdrawn with the anus.

The above and other features of the present invention will be more fully understood from the following detailed description and the accompanying drawings, in which:

FIG. 1 is a side view elevation, partly in cutaway cross-section, of an eviscerator according to the presently preferred embodiment of the present invention;

FIG. 2 is a bottom elevation of a portion of the eviscerator illustrated in FIG. 1, taken at line 2—2 in FIG. 1;

FIG. 3 is a front end view elevation taken at line 3—3 in FIG. 1;

FIG. 4 is a cutaway view of a representation of a three-way slide valve for use in a modification of the present invention; and FIG. 5 is a bottom view of a portion of a modification of the eviscerator illustrated in FIG. 1.

Referring to FIGS. 1–3 which illustrate the preferred form of an eviscerator according to the present invention, there is illustrated an eviscerator 10 having a housing 12. Mounted within housing 12 is motor 14 such as an air or hydraulically driven motor, and a valve 16. Motor 14 is connected via suitable conduit means 66 to valve 16, which in turn is connected via conduit means 68 to connector means 18. Connector means 18 is connected to a source 19 of pressurized fluid, such as air under pressure for powering the motor. By way of example, a flexible hose 21 may be connected to connector means 18 and thence to a source 19 of pressurized fluid. By way of example, source 19 may be a compressor or pump, or may be a tank of pressurized fluid. Inlet connector means 20 of valve 16 is connected via suitable conduit means 22 to connector means 24 disposed outside of housing 12. Connector means 24 is adapted to be connected to a suitable flexible hose 26 which in turn is adapted to be connected to a vacuum system 27, which, by way of example, may be a vacuum pump. Exhaust ports 23 may be provided through housing 12 to permit discharge of fluid from the motor during its operation.

Upon operation of motor 14, chuck 28, connected to the shaft of motor 12, is driven about axis 30. Chuck 28 is adapted to be coupled to driver 32 of cutter 34. By way of example, chuck 28 may be a substantially cylindrical shaft having an internal hexagonal portion for coupling with the driver of the cutter. Vacuum chamber 36 is formed by housing 38 mounted within housing 12. Housing 38 closes over chuck 28. Bushing 40 is supported by housing 38 and is adapted to fit over the cylindrical portion of shaft 42 of cutter 34. By way of example, housing 38 and bushing 40 may be constructed of "Teflon" or other suitable plastic material so as to provide a seal over the cylindrical outside diameter of chuck 28 and the cylindrical shaft 42 as they rotate.

Cutter 34 includes a circular cutting edge 44 which is preferably serrated. A plurality of apertures 46 are disposed through shaft 42 of cutter 34 to provide communicatiton between the interior of cutter 34 and vacuum chamber 36. Cutter 34 preferably includes an enlarged cavity portion 48 at the forward end of the cutter and adjacent the circular cutting edge. Screen 50 is preferably located at the rear of cavity 48 to prevent the entrails of the animal being cleaned from being drawn into the interior of shaft 42 where it could clog apertures 46.

Conduit 52 is connected in communication with the interior of vacuum chamber 36 and is connected via connector means 54 to the outlet side of valve 16.

Valve 16 preferably includes a pair of control buttons 56 and 58 which protrude from the housing 12 and operate on control valves to control the fluid delivered to the motor and to control the vacuum drawn from cavity 14 in the cutter. The control buttons are arranged so that depression of control button 56 provides fluid communication between conduit 52 and conduit 22 so that air is drawn from chamber 48 inside the cutter toward the source of vacuum connected to hose 26. Depression of control button 58 causes pressurized air to be supplied to motor 14 so that chuck 28 is rotated about axis 30. By way of example, the air for the motor may be supplied at about 90 p.s.i.g. Approximately 7 to 10 inches of vacuum has been found suitable for application to vacuum hose 26.

In the operation of the device, cutter 34 is inserted into housing 12 so that drive 32 is engaged by chuck 28. A suitable ball detent means (not shown) may be provided so that the cutter is held fixed to the chuck. Cutting edge 44 of the cutter is sized relative to the animal to be worked on so as to be slightly larger than the anus. The cutting edge 44 of the cutter is applied around the anus of the animal and both control buttons 56 and 58 are depressed so as to rotate cutter 34 and apply suction to cavity 48 within the cutter. Cutting edge 44 revolves about axis 30 until the anus is cut from the body of the animal to form a core. The suction draws the core formed by the anus toward screen 50. The cutting device turns freely relative to the animal, and it is preferred that no twisting of the core occurs, lest it twist off the entrails. Eviscerator 10 is then withdrawn from the opening cut in the animal, and the entrails of the animal are thereby withdrawn from the animal. The core is held within cavity 48 by suction. Screen 50 is provided to prevent the core and any contents from clogging the vacuum system. The entrails may then be cut free of the animal after their removal and control button 56 is released and the anus and entrails fall free of the eviscerator.

It is desirable that the speed of rotation of cutter 34 about axis 30 be fast enough as to assure proper cutting of an opening through the animal, and yet not so fast as to cause the eviscerator to twist in the hand of the operator or to cause the anus and entrails to twist with the cutter. It has been found that a motor speed of approximately 700 r.p.m. is satisfactory for an eviscerator having a cutting edge about ¾ inch in diameter.

FIGS. 4 and 5 illustrate a modification of the control of valve 16. In this case, a three position slide control 60 is mounted to housing 12. Slide control 60 includes a first slot 62 which is always connected to conduit 52, and a second slot 64 which is always connected to conduit 66 leading to motor 14. Conduit 22 is normally sealed against the body of slide control 60 and is adapted to be brought into communication with slot 62. Conduit 68 is normally sealed against the body of slide control 60 and is adapted to be placed in communication with slot 64. Conduit 68 is connected to connector means 18 (FIG. 1) for receiving fluid under pressure. Thus, a source of vacuum is connected to conduit 22 while a source of pressurized fluid is connected to conduit 68. Slot 62 is longer than slot 64 so that there will exist a center position where conduit 22 may be brought into communication with slot 62 while conduit 68 is prevented from communication with slot 64.

When slide control 60 is in its first position, illustrated in FIGS. 4 and 5, conduit 22 is sealed from communication with conduit 52 by the body of the slide control, and conduit 68 is sealed from communication with conduit 66 by the body of the slide control. Thus, in this condition, there is no vacuum or suction in cavity 48 of the cutter, and air under pressure is not delivered to the motor, and the eviscerator is in an off condition. When moved to its center position, slide control 60 provides fluid communication between conduits 22 and 52 through slot 62, thereby applying a vacuum to cavity 48 of the cutter. However, conduit 68 is still prevented by the seal between conduit 68 and the body of slide control 60 from supplying fluid under pressure to conduit 66, so the motor will not operate. When the slide control is moved to its third position, conduits 22 and 52 are in fluid communication through slot 62 as hereinbefore described, and conduit 68 is in fluid communication with conduit 66 through slot 64. In the third position, vacuum is applied to cavity 48 and motor 14 is caused to operate.

In the operation of an eviscerator utilizing the optional slide control illustrated in FIGS. 4 and 5, the cutting edge of the eviscerator is applied around the anus of the animal as hereinbefore described, and slide control 60 is moved to the third position, bringing conduit 22 into communication with conduit 52, and to bring conduit 68 into communication with conduit 66. In this position of the slide control, the motor will operate the cutter to cut a core around the anus of the animal, and the vacuum will pull the core into cavity 48 of the cutter. The slide control is then moved to its second or "vacuum only" position and the entrails and anus of the animal are pulled away from the animal. The entrails may then be cut from the animal and the slide control may be moved to its first position to turn off the vacuum and allow the anus and entrails to fall free.

The eviscerator according to the present invention may be small and lightweight. The size of housing 12 is approximately that of an ordinary flashlight so that the control buttons or slide control, whichever might be used, are readily operable by the operator.

The present invention thus provides an eviscerator for removing the entrails from an animal. The eviscerator is portable, lightweight, easy to use and easily constructed. The method according to the present invention is capable of the removal of entrails from an animal with a minimum of waste.

This invention is not to be limited by the embodiment shown in the drawings and described in the description, whch are given by way of example and not of limitation, but only in accordance with the scope of the appended claims.

What is claimed:

1. An eviscerator for removing the entrails from an animal, said eviscerator comprising: a housing; generally cylindrical cutter means journalled to said housing, said cutter means having a cutting edge and an axis about which the cutter may be rotated; said cylindrical cutter means providing a cavity opening adjacent said cutting edge; a source of reduced pressure; a source of pressurized fluid; a fluid-operable motor supported by said housing for rotating said cutting means about said axis; means connecting said cavity to said source of reduced pressure, means connecting said source of pressurized fluid to said motor and a valve associated with each of said means for selectively connecting said source of reduced pressure to said cavity and for selectively connecting said source of pressurized fluid to said motor, said valve having a first position whereby the valve prevents reduction of fluid pressure in said cavity and prevents delivery of pressurized fluid to said motor, a second position whereby the valve permits reduction of fluid pressure in said cavity and prevents delivery of pressurized fluid to said motor, and a third position whereby the valve permits a reduction of pressure in said cavity and permits delivery of pressurized fluid to said motor, said cutting edge and said opening being so disposed and arranged so that when the valve is moved to its third position and the cutting edge is applied to the anus of the animal, said motor drives said cutter means and an artificial opening is cut around the anus and the reduced pressure in the cavity dislodges the anus and pulls the same into the cavity through the opening, and when the valve is moved to its second position, the reduced pressure in said cavity holds the anus therein and the entrails may be removed from the animal through the artificial opening.

References Cited

UNITED STATES PATENTS

| | | | |
|---|---|---|---|
| 2,590,785 | 3/1952 | Nealy | 17—11 |
| 2,795,815 | 6/1957 | Dahlberg | 17—11 |
| 2,943,346 | 7/1960 | Jensen | 17—11 |
| 3,147,513 | 9/1964 | Schneider et al. | 17—11 |

FOREIGN PATENTS 874,098  8/1961  Great Britain.

LUCIE H. LAUDENSLAGER, Primary Examiner